Jan. 13, 1970   YOSHITSUGU TSUCHIYA ET AL   3,489,177
CONTROL VALVE FOR USE WITH FLUID STEP MOTOR
Filed July 19, 1967   14 Sheets-Sheet 3

INVENTORS
Yoshitsugu Tsuchiya
Kazuyoshi Uyama
BY
ATTORNEY

Width of Land = 1.5 Steps. Width of Cavity = 1.5 Steps
Width of Port = 1.5 Steps. Phase Difference = 1.5 Steps

Fig. 24

Width of Land = $\frac{9}{7}$ Steps. Width of Cavity = $\frac{12}{7}$ Steps
Width of Port = $\frac{12}{7}$ Steps. Phase Difference = 1.5 Steps

Fig. 25

Width of Land = 1 Step. Width of Cavity = 2 Steps
Width of Port = 2 Steps. Phase Difference = 1.5 Steps

Fig. 26

Width of Land = 1.5 Steps. Width of Cavity = 1.5 Steps
Width of Port = 1 Step. Phase Difference = 1.5 Steps

Fig. 27

Width of Land = 1.5 Steps. Width of Cavity = 1.5 Steps
Width of Port = 2 Steps. Phase Difference = 1.5 Steps

Fig. 28

Width of Land = 1 Step. Width of Cavity = 2 Steps
Width of Port = 1 Step. Phase Difference = 1.5 Steps

Fig 29

Width of Land = 1 Step. Width of Cavity = 2 Steps
Width of Port = 2.5 Steps  Phase Difference = 1.5 Steps

Fig. 30

Width of Land = 1.5 Steps. Width of Cavity = 1.5 Steps
Width of Port = 1.5 Steps. Phase Difference = 1 Step

Fig. 31

Width of Land = 1.5 Steps. Width of Cavity = 1.5 Steps
Width of Port = 1.5 Steps. Phase Difference = 0.5 Step / 3,489,177
CONTROL VALVE FOR USE WITH
FLUID STEP MOTOR
Yoshitsugu Tsuchiya, Urawa-shi, Saitama-ken, Japan
(% Mr. Hasegawa, 9–22, 1-chome, Kishi-machi, Japan), and Kazuyoshi Uyama, 23, 3-chome, Nishirokugo, Ota-ku, Tokyo-to, Japan
Filed July 19, 1967, Ser. No. 654,475
Claims priority, application Japan, July 28, 1966,
41/49,085
Int. Cl. F17d 3/00; G06d 1/02
U.S. Cl. 137—625.19                     7 Claims

ABSTRACT OF THE DISCLOSURE

The present invention relates to a control valve for use with a fluid step motor; in which a spool rotatably fitted into a sleeve is mechanically coupled to the output shaft of a rotary type fluid driving mechanism, and in order to control the direction of rotation and the angle of rotation per step of the fluid driving mechanism, two cavity groups each consisting of the same number of equidistantly spaced apart cavities or recesses are provided in two columns in the spool with a suitable phase difference relative to each other while sets of ports each consisting of three ports are provided in the sleeve opposite to each of the cavity groups respectively, whereby when the corresponding ports of both of two sets of ports are successively opened to the outside, the difference between the opening areas of said ports with respect to the respective cavity groups can be utilized to impart a predetermined angular displacement to the fluid driving mechanism and the direction of rotation of the fluid driving mechanism can be controlled by the selection of the sequential order of opening these ports.

CROSS-REFERENCE TO RELATED APPLICATION

The present application discloses improvements over our application, Ser. No. 603,654, filed Dec. 21, 1966.

BACKGROUND OF INVENTION

The present invention relates to a control valve for use in a fluid step motor assembly in combination with a rotary type fluid driving mechanism, the control valve being adapted to control the direction of rotation of the fluid driving mechanism by the sequential order of the signals to be applied and also to control the angle of rotation of the fluid driving mechanism by the number of signals to be applied, and more particularly relates to improvements over the control valve disclosed in our application Ser. No. 603,654, filed Dec. 21, 1966.

The above described original invention relates to a control valve of the type described above and characterized in that a spool provided with an even number of equidistantly peripherically disposed lands is rotatably fitted into a sleeve so that the same number of cavities or recesses with that of said lands are defined; said cavities or recesses are alternately communicated with each other and thus two inter-communicated cavity or recess groups are respectively communicated with bores leading to the outside; one or a plurality of sets of ports each consisting of three ports and being adapted to communicate sequentially with said cavities are provided in the sleeve, the positions of said three ports of each set of ports being determined in such a way that, when one of said three ports is closed by one of lands of the spool, the remaining two ports are located 240°/N (where N is the number of lands) backwardly of the even numbered lands respectively from said land closing said first mentioned port in the clockwise and counterclockwise directions; said bores leading to the outside are communicated with both of the inlets of the rotary type fluid driving mechanism and also with a fluid pressure source through reducing valves or means; and the output shaft of the rotary type fluid driving mechanism is mechanically coupled to said spool, whereby when the ports of the sleeve are sequentially opened to communicate with the outside, the direction of rotation of the rotary type fluid driving mechanism is controlled by the sequential order of opening said ports to the outside while the angle of rotation of the rotary type fluid driving mechanism is controlled by the number of opening said ports.

With this structure of the control valve, however, the angle of rotation per step is determined by the number of lands provided peripherally around the spool so that the number N of lands must be increased as much as possible in order to effect a discrete fine angular displacement. For this purpose, the diameter of the spool may be suitably enlarged so that the lands as many as desired may be provided. However, this will result in not only increasing the size of the control valve but also decreasing the response characteristics thereof. Therefore, it will be quite meaningless to minimize the angle of rotation per step unless the number of lands is increased without increasing the diameter of a spool. Thus from this view point, it will be proposed to minimize the widths of land and cavity therebetween in order to provide the lands as many as possible around the periphery of a spool having a predetermined diameter. However, the land plays a roll for closing the port provided in the sleeve when the spool rests in a stabilized state whereas the port provided in the sleeve and the cavity provided in the spool together becomes a flow path for working fluid when the control valve is actuated so that the flow resistance must be minimized. Under the circumstances, it is not desirable to minimize the widths of land and cavity below a certain value, so that the number of lands to be provided around the spool having a predetermined diameter will be limited. Thus it will be clear that it is impossible to minimize the angle of rotation by simply increasing the number of lands above a certain value.

SUMMARY OF THE INVENTION

Therefore, the object of the present invention is to improve a control valve of the type described and to provide a novel and improved control valve in which the angle of rotation per step is minimized without increasing the diameter, that is the circumferential length of a spool.

This object can be accomplished by the arrangement and disposition of the present invention, wherein two cavity groups each consisting of the same number of equidistantly peripherally provided cavities are disposed at the right and left sides respectively around a spool in two columns with a suitable phase difference with respect to each other, and the positions of one or a plurality of sets of ports each consisting of three ports to be provided in correspondence with said two cavity groups are determined in such a way that, when a pair of corresponding ports each selected from the different sets of ports are in a stabilized state with each port opening the same opening area with respect to each of the cavity groups, the remaining two ports of each set of ports are located so as to be spaced a distance of ⅓ or ⅔ of (the width of cavity+the width of land) backwardly in the clockwise and counterclockwise directions from an arbitrary stabilizing point at the spool.

When the cavity groups are disposed in the spool in two columns with a suitable phase difference and one or a plurality of sets of ports each consisting of three ports are provided opposite to said cavity groups in the sleeve, a more number of cavities, that is lands can be provided around the spool having a predetermined diameter. Furthermore, when a pair of corresponding ports each selected from the different sets of ports are sequentially communicated with the outside, then the difference between the opening areas to the cavity groups of said pair of corresponding ports can be utilized to impart to a rotary type fluid driving mechanism an angular displacement of a predetermined angle of rotation corresponding to the number of lands and to control the direction of rotation of said fluid driving mechanism by the selection of the sequential order of opening said ports. Thus, it becomes now possible to minimize the angle of rotation per step without increasing the diameter of the spool.

The above and other objects, features and advantages of the present invention will be apparent in the course of the following description taken in conjunction with the accompanying drawings.

Description of the preferred embodiment:

In preparation of the detailed description of one preferred embodiment of the present invention, our pending application, Ser. No. 603,654, filed Dec. 21, 1966, will be reviewed briefly with reference to FIGS. 9 and 10, which show that a spool 32 provided peripherally equidistantly with an even number of lands 32a, 32b, 32c, 32d, 32e, 32f . . . (in the figures six lands are shown) is rotatably fitted into a cylindrical sleeve 31 having three ports 31a, 31b and 31c provided through the peripheral surface thereof. These lands 32a, 32b, 32c, 32d, 32e, 32f . . . define cavities 32a, 33b, 33c, 33d, 33e, 33f . . . the total number of which is same with that of the lands. The positions of the three ports 31a, 31b, and 31c of sleeve 31 are determined in such a way that when one of them is closed by one of the lands of spool 32, the remaining two ports are located in the clockwise and counterclockwise directions respectively with the angular displacement of 240°/N (N: number of lands) behind relative to the even-numbered lands from said land closing the first mentioned port. The cavities 33a to 33f are alternately communicated with annular grooves 34 and 35 provided at both of the end portions of the spool 32. Therefore, when one of the ports 31a, 31b and 31c of sleeve 31 is closed by one of the lands of spool 32, one of the remaining ports is permitted to communicate with one of the two cavity groups consisting of cavities inter-communicated with each other through the annular groove 34 or 35 while the other of the remaining ports, with the other of two cavity groups.

Figure 11:
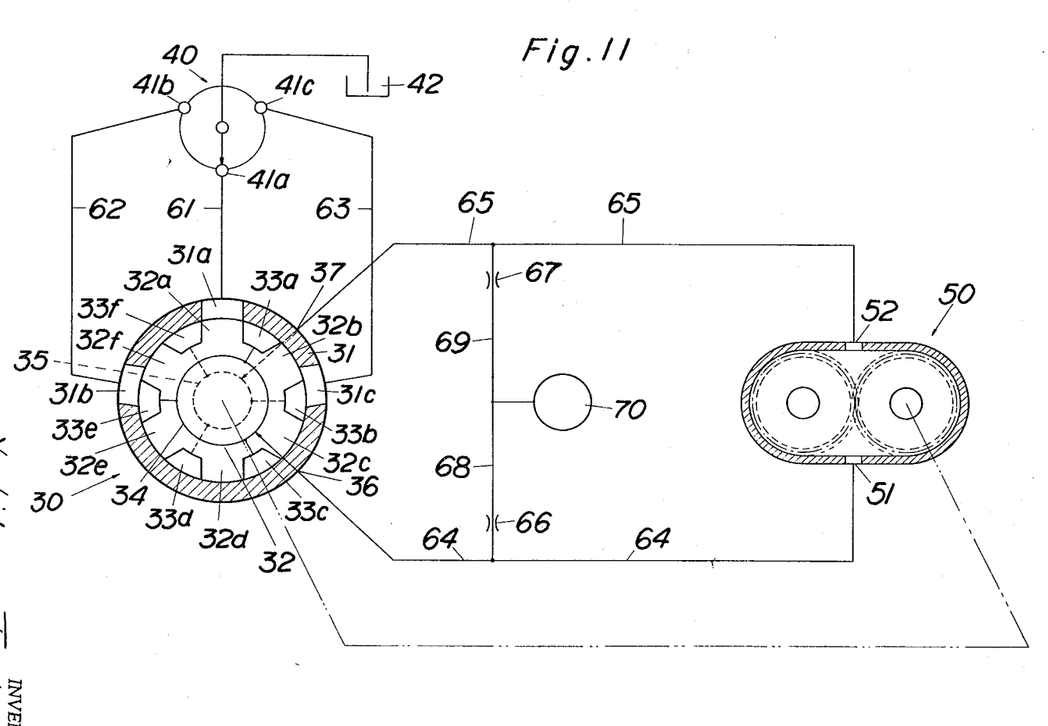
FIGURE 11 is a circuitry diagram illustrating a fluid step motor assembly including the control valve shown in FIGURES 9 and 10 and a rotary type fluid driving mechanism.

FIG. 11 shows one example of a fluid step motor assembly including the above described control valve 30, a selector valve 40 for applying the input signal to the control valve 30 and a rotary type fluid driving mechanism 50 mechanically and operatively coupled with the control valve 30. In this assembly, as shown in FIG. 11, the ports 31a, 31b and 31c of the sleeve 31 of the control valve 30 are communicated with ports 41a, 41b and 41c of the selector valve 40 through pipings 61, 62 and 63 respectively. The annular grooves 34 and 35 provided in the spool 32 are respectively communicated with the inlets 51 and 52 of the rotary type fluid driving mechanism 50 through bores 36 and 37 provided in the sleeve 31 of the control valve 30 and pipings 64 and 65. The pipings 64 and 65 are respectively branched by means of pipings 68 and 69 which in turn are communicated with a fluid pressure source 70 and which have reducing valves 66 and 67 respectively. The output shaft of the rotary type fluid driving mechanism 50 is directly or through a gear train coupled to the spool 32 of the control valve 30. In order to facilitate the understanding the fluid flow path within the control valve 30, in FIG. 11 the annular grooves 34 and 35 provided in the spool 32 are shown by the full and dotted line circles concentrically of the spool 32 while the communication paths of the annular grooves 34 and 35 with the cavities 33a to 33f and the bores 36 and 37 are shown by the full and dotted lines respectively. The selector valve 40 and the rotary type fluid driving mechanism 50 may be of the conventional type having the standard structure and function and being available in the market.

With this construction, the ports 31a, 31b and 31c of the control valve 30 are caused to communicate sequentially with a tank 42 by means of the selector valve 40 (or directly with the atmosphere when the working fluid is air). Thus, when the communication of port 31a with the tank 42 as shown in FIG. 11 is switched over to that of port 31b with the tank 42 by means of the selector valve 40, the inlet 51 of the rotary type fluid driving mechanism 50 is caused to communicate with the tank 42 through the port 31b, the cavity 33e, the annular groove 34 and the piping 64 so that the rotary type fluid driving mechanism 50 begins to rotate together with the spool 32 of the control valve 30 in the clockwise direction and stops when the land 32e of the spool 32 closes the port 31b. Next, when the selector valve 40 switches the port 31b to the port 31c for establishing the communication with the tank 42, the inlet 51 of the rotary type fluid driving mechanism 50 is permitted to communicate with the tank 42 through the port 31c, the cavity 33a, the annular groove 34 and the piping 64 so that the rotary type fluid driving mechanism 50 begins to rotate together with the spool 32 of the control valve 30 also in the clockwise direction and stops when the land 32a closes the port 31c. In the similar manner, as the selector valve 40 establishes the communication of the tank 42 with the ports 31a, 31b, 31c, 31a . . . in the order named, the rotary type fluid driving mechanism 50 is permitted to rotate together with the spool 32 of the control valve 30 in the clockwise direction by a predetermined angle of rotation intermittently. On the other hand, when the selector valve 40 establishes the communication of the tank 42 with the ports 31a, 31c, 31b, 31a . . . in the order named, then the inlet 52 of the fluid driving mechanism 50 is always communicated with the tank 42 through one of the cavities 33b, 33d and 33f belonging to the other cavity group, the annular groove 35 and the piping 65. Therefore, the rotary type fluid driving mechanism 50 is permitted to rotate together with the spool 32 of the control valve 30 in the counterclockwise direction by a predetermined angle of rotation intermittently.

In the embodiment of the present invention heretofore described, the annular grooves 34 and 35 each communicating alternatively with the cavities 33a to 33f are provided at the end portions of the spool 32 respectively. However, the annular grooves 34 and 35 may be provided in the inner surface of the sleeve 31 or alternatively grooves or bores may be provided in both of the end portions of the sleeve 31 in such a way that when each port is opened to communicate with the outside, the thus provided grooves or bores maintain the communication of said opened port with one of the cavities at least until said opened port is closed by the land. When the ports 31b, 31c and 31a or 31c, 31b and 31a in the order named are successively and sequentially communicated with the tank 42 so that the spool 32 of the control valve 30 is rotated three steps, the spool 32 is caused to return its initial position when two lands advance. Therefore, the angle of rotation per step is given by the following equation:

$$\theta = 360 \times 2/N \times 1/3 = 240/N \text{ deg.}$$

where N is the number of lands.

From the above equation it will be seen that in order to minimize the angle of rotation per step the number of lands N must be increased. However, with the above described construction, the number of lands N to be provided along the peripheral surface of the spool 32 is limited.

Figure 9:
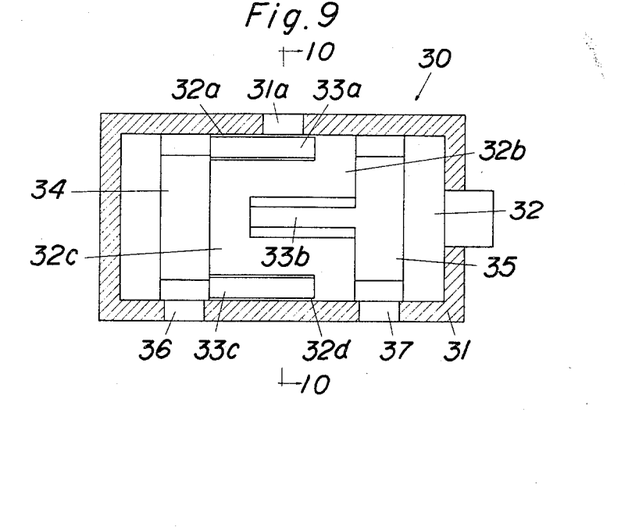
FIGURE 9 is a sectional view of one embodiment of control valve disclosed in our previous application.
Figure 10:
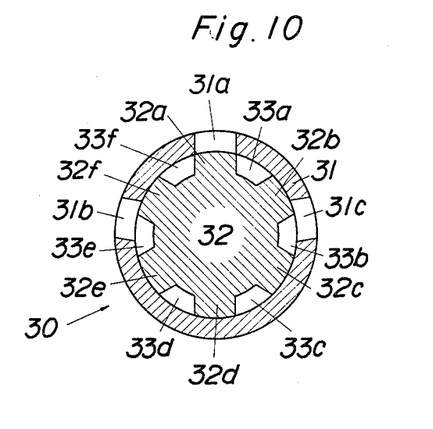
FIGURE 10 is a sectional view taken along the line 10—10 of FIGURE 9.
Figure 12:
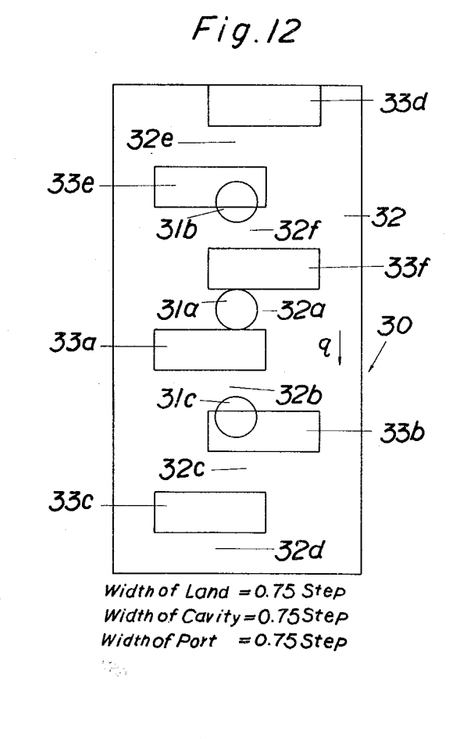
FIGURES 12 to 21 are explanatory views showing the developments of various types of control valve according to the present invention.

Now we hereinafter study the number of lands permitted to be provided around the spool 32 of the control valve 30 with reference to FIG. 12 showing the development of the control valve 30 shown in FIGS. 9 and 10. Here we assume that the width of land and the width of the port be the minimum values permissible in view of the flow resistance of working fluid. FIG. 12 shows the control valve 30 in the stationary state in which the port 31a selected by the selector valve 40 is closed by the land 32a. However, when the port 31b is selected for communication with the outside, the spool 32 is caused to move in the direction in which the land 32e tends to close the port 31b, that is in the direction indicated by the arrow q in FIG. 12, and then stops when the land 32e closes the port 31b. Therefore, in order to generalize the widths of land and cavity and the width of port, they will be hereinafter represented by a step unit, that is the angle of rotation of the spool 32 caused by one switching-over of the port. In FIG. 12, when the ports 31b, 31c and 31a or 31c, 31b and 31a in the order named are sequentially communicated with the outside, that is when the spool 32 is advanced three steps from the state shown in FIG. 12, the land 32e or 32c moves to the position where the land 32a was initially present so that the land 32e or 32c closes the port 31a and the control valve 30 returns to its initial stabilized state. Therefore, the spool 32 advances during three steps the distance expressed by the following equation:

3 steps = 2 × (width of land + width of cavity)

In case of FIG. 12, since width of land = width of cavity = width of port then, 3 steps = 4 × (width of land)

Therefore, width of land = width of cavity = width of port = 0.75 step

As shown in the above expression, the width of land is made equal with the width of port in order to prevent the leakage of working fluid when the control valve 30 (which will be hereinafter referred as "prior art control valve") is held in a stationary position, or to prevent the communication between two cavity groups through a port when the land passes through this port in the course of one step advancement.

Considering that the nozzle flapper in the prior art servo valve is ejecting the working oil even when the input is zero or the steady-state current is required in an electric step motor even when the motor is not running, we have come to the conclusion that it is not necessary to minimize to zero the leakage of working fluid, but the leakage to some extent is permitted in the control valve of the type described when the control valve is stationary.

Figure 13:
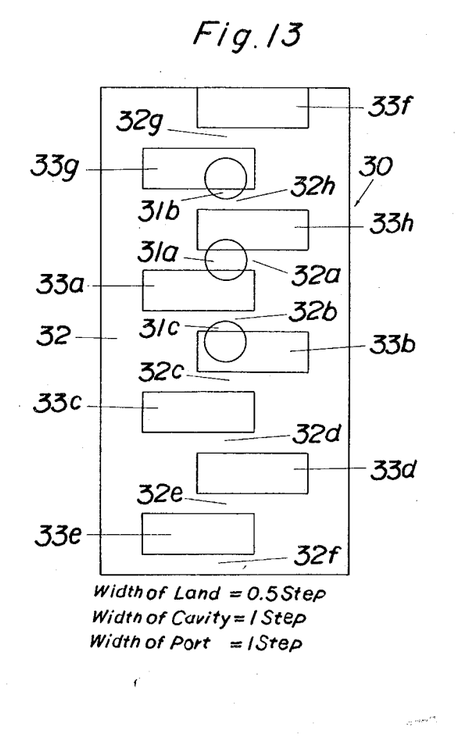

Bearing the foregoing in mind, we can make the width of land smaller than the width of port in the prior art control valve. For example as shown in FIG. 13, the width of land is made half of the width of port (the width of cavity) so that the so-called under-lap method may be employed in which the spool 32 having the same circumferential length with that of the spool of prior art control valve shown in FIG. 12 can be provided with two more lands and cavities compared with the prior art control valve, with the total numbers of lands 32a to 32h and the cavities 33a to 33h being 8 respectively. In this case, before the control valve comes to rest, the cavity 33a belonging to one cavity group and the cavity 33h belonging to the other cavity group are permitted at the same time to communicate with the port which is in turn communicating with the outside, that is the port 31a in FIG. 13. Therefore, the flow circuit or path from the fluid pressure source 70 through the piping 68, the reducing valve 66, the piping 64, the annular groove 34, the cavity 33a and the port 31a to the outside, and another flow circuit or path from the fluid pressure source 70 through the piping 69, the reducing valve 67, the piping 65, the annular groove 35, the cavity 33h and the port 31a to the outside are established for working fluid. Thus when the reducing valves 66 and 67 are reduced to the same degree, the pressure within the pipings 64 and 65 are made equal when the opening areas of the cavities 33a and 33h relative to the port 31a are equal, so that the rotary type fluid driving mechanism 50 together with the spool 32 is caused to stop and to be held stationary. Thus, such under-lap method as described above can be employed. When this method is employed, only the width of land can be made smaller without decreasing the width of cavity and the width of port so that more lands can be provided around the periphery of the spool 32 having the same circumferential length, whereby the angle of rotation in each step can be accordingly minimized. The widths of land and cavity and the width of port of FIG. 13 are represented in term of a step unit by the following expression:

2 × (width of land) = width of cavity = width of port and the spool advances:

3 steps = 2 × (width of land + width of cavity)

hence 3 steps = 6 × (width of land)

therefore, width of land = 0.5 step width of cavity = width of port = 1 step

Figure 14:
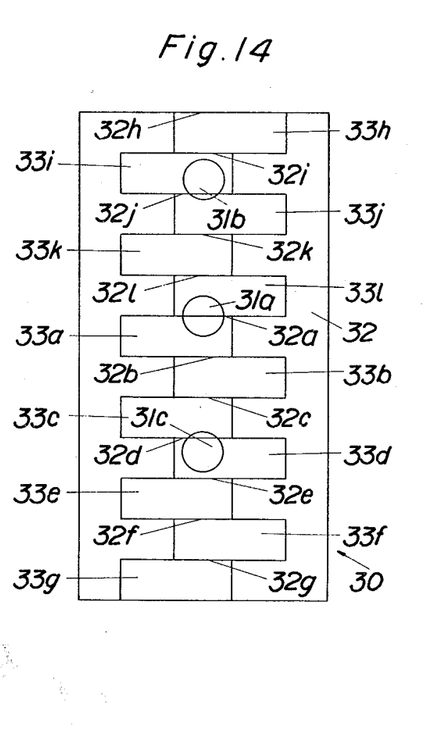
Figure 15:
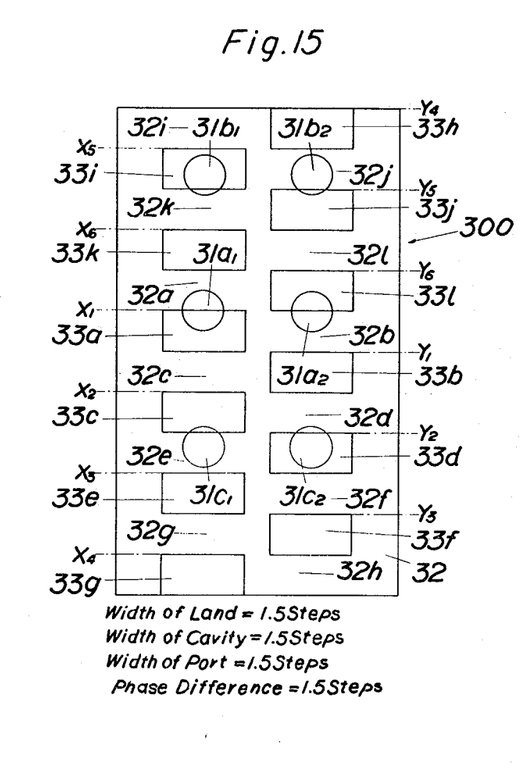
Figure 16:
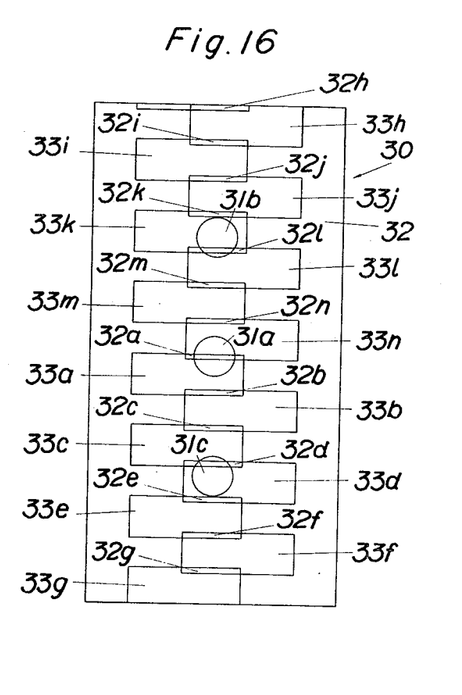
Figure 17:
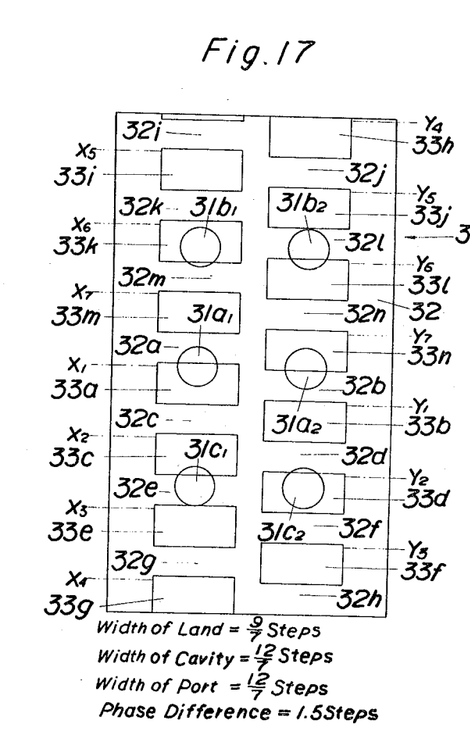
Figure 18:
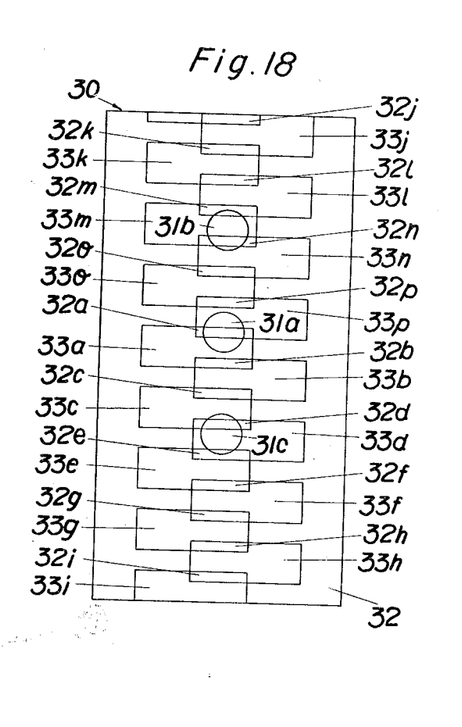
Figure 19:
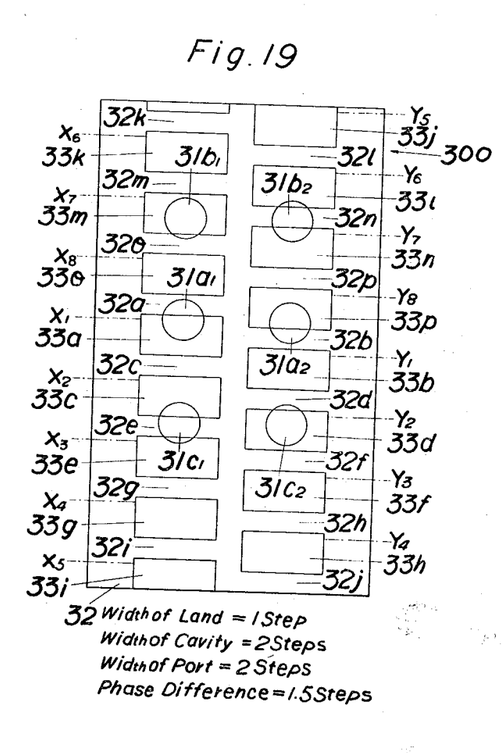

This idea can be extended in such a way that the width of land can be made zero as shown in FIG. 14 or the width of land can be extended into the negative region as shown in FIGS. 16 and 18. However, when the width of land is made zero or extended into the negative region, two different groups of cavities are made to communicate with each other. Therefore, according to the invention, two groups of cavities are disposed separately on the right and left sides of the spool as shown in FIGS. 15, 17 and 19. At the same time, the ports 31a, 31b and 31c are arranged into two sets of ports $31a_1$, $31b_1$ and $31c_1$ and $31a_2$, $31b_2$ and $31c_2$, and the ports $31a_1$ and $31a_2$, $31b_1$ and $31b_2$ and $31c_1$ and $31c_2$ are respectively communicated with each other at the exterior of the sleeve. When the width of land is made zero or negative as described hereinbefore, it seems that the land does not exist any longer. Therefore, we define a land as "a convex portion between two adjacent cavities in the same cavity group." The smaller the width of land is made from the positive to the negative region, the more the lands may be provided around the peripheral surface of the spool 32 having the same circumferential length so that the angle of rotation per step can be more and more minimized.

Figure 1:
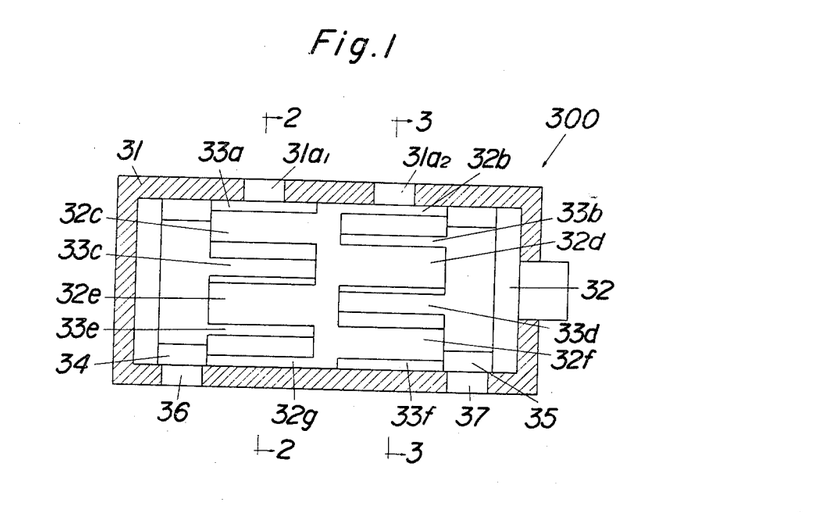
FIGURE 1 is a longitudinal sectional view illustrating one embodiment of control valve according to the present invention.
Figures 2, 3:
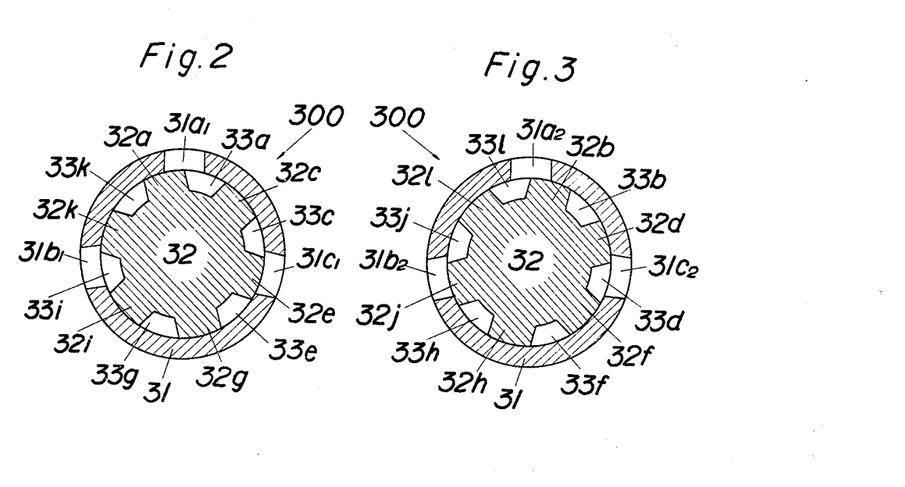
FIGURE 2 and FIGURE 3 are sectional views taken along the lines 2—2 and 3—3 of FIGURE 1 respectively.
Figure 4:
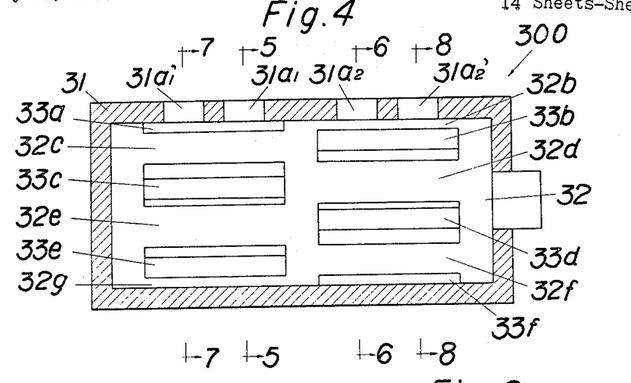
FIGURE 4 is a longitudinal view of another embodiment or modification of control valve according to the present invention.
Figure 5:
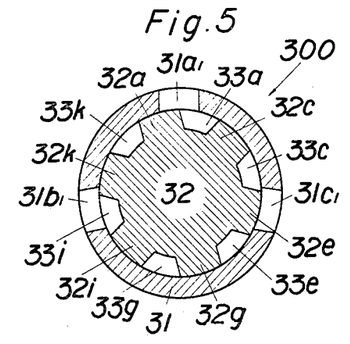
FIGURES 5, 6, 7 and 8 are sectional views taken along the lines 5—5, 6—6, 7—7 and 8—8 of FIGURE 4 respectively.
Figure 6:
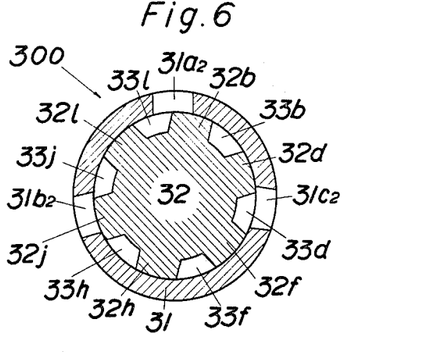
Figure 7:
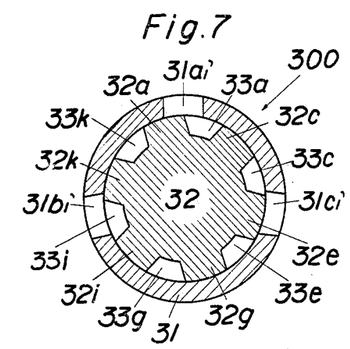
Figure 8:
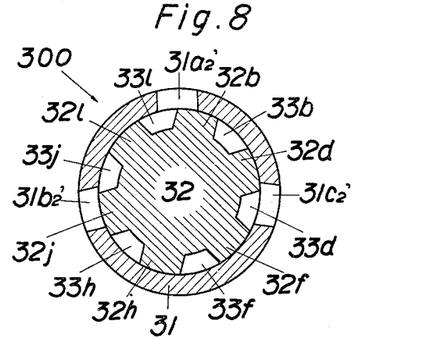

One preferred embodiment based upon the above described underlying idea of the present invention will be hereinafter described in detail with reference to FIGS. 1, 2 and 3 in which the control valve is generally designated by 300. In this embodiment, the annular grooves 34 and 35 are provided at both end portions of the spool 32. However, the annular grooves 34 and 35 may be provided in the inner surface of the sleeve 31 or alternatively grooves or bores may be provided in both end portions of sleeve 31 so that when ports are opened to communicate with outside, the thus opened ports are maintained in communication with one of the cavities belonging to the same cavity group at least until the opening areas of the ports to the respective cavities are made equal. The embodiments based on such idea are shown in FIGS. 4, 5, 6, 7 and 8. In these embodiments, each cavity belonging to one cavity group is not communicated with one another through the annular groove 34 or 35, but each cavity 33a to 33l is arranged and disposed independently. Furthermore, two sets of ports $31a_1$, $31b_1$ and $31c_1$ and $31a_2$, $31b_2$ and $31c_2$ are arranged and disposed in the axial direction of the sleeve 31, and other ports $31a_1'$, $31b_1'$ and $31c_1'$ and ports $31a_2'$, $31b_2'$ and $31c_2'$ are provided in the sleeve 31. Then, the ports $31a_1'$, $31b_1'$ and $31c_1'$ and $31a_2'$, $31b_2'$ and $31c_2'$ are communicated with each other respectively at the exterior of the sleeve 31 for effecting the same functions of the annular grooves 34 and 35 and the bores 36 and 37 provided in the sleeve 31 and communicated with the annular grooves 34 and 35 respectively.

Next, the relative position of the spool 32 with respect to the port selected by the selector valve when the control valve 300 of the present invention rests at a stabilizing point will be described. For this purpose, we must explain about the change in the opening areas of the ports $31a_1$ and $31a_2$ with respect to the cavities $33a$ and $33l$ around the center $X_1$ which is the intermediate point with respect to the direction of rotation of the cavity $33a$ belonging to one group of cavities and of the cavity $33l$ belonging to the other group of cavities. It will be understood that at this point $X_1$ the areas of the two cavities $33a$ and $33l$ opening to the ports $31a_1$ and $31a_2$ are equal and that the area diagram showing the variation in area of opening with the center being $X_1$ when the spool 32 is displaced from this point must be symmetrical with respect to each of the cavities $33a$ and $33l$. In FIG. 15, the points which satisfy the above condition are the groups of $X_1, X_2, X_3 \ldots X_6$ to which belongs the point $X_1$ at which the ports $31a_1$ and $31a_2$ are positioned and another group of $Y_1, Y_2, Y_3 \ldots Y_6$ which are positioned between the first group of $X_1, X_2, X_3 \ldots X_6$. We compare the two states in which one of the first group $X_1, X_2, X_3 \ldots X_6$ and one of the second group of $Y_1, Y_2, Y_3 \ldots Y_6$ are so selected by the selector valve 40 that the opening areas of both of the cavity groups with respect to the ports which are opened to communicate with the outside are made equal. Then, the relative positions of the cavity groups with respect the ports are reversed with each other. That is, when the point $X_1$ belonging to the first group is now, for example, positioned in such a manner that the opening areas with respect to the selected ports $31a_1$ and $31a_2$ of the cavities $33a$ and $33l$ each belonging to the different cavity groups respectively are made equal, then the lower half portion of the port $31a_1$ opens to the cavity $33a$ whereas the upper half portion of the port $31a_2$ opens to the cavity $33l$. But when the point $Y_1$ of the second group is displaced to the point $X_1$ in FIG. 15 so that the opening areas of the cavities $33a$ and $33b$ of the first and second groups with respect to the ports $31a_1$ and $31a_2$ are made equal, then the upper half portion of the port $31a_1$ opens to the cavity $33a$ whereas the lower half portion of the port $31a_2$ opens to the cavity $33b$. Therefore, as is the case of FIG. 11 let it be assumed that the left side cavities $33a$, $33c$, $33e$, $33g$, $33i$ and $33k$ are communicated with the inlet 51 of the rotary type fluid driving mechanism 50 through the annular groove 34, the bores 36 and the piping 64 while the right side cavities $33b$, $33d$, $33f$, $33h$, $33j$ and $33l$, with the inlet 52 of the rotary type fluid driving mechanism 50 through the annular groove 35, the bores 37 and the piping 65. When the point $X_1$ is displaced even a little distance from the state in which the opening areas of the ports $31a_1$ and $31a_2$ with respect to the cavity groups are equal, toward the direction in which the spool 32 is caused to rotate in the counterclockwise direction, that is the upper direction in FIG. 15, the opening area of the cavity $33a$ with respect to the port $31a$ increases while the opening area of the cavity $33l$ with respect to the port $31a_2$ diminishes so that the spool 32 together with the rotary type fluid driving mechanism 50 is caused to rotate in the clockwise direction, (downward direction in FIG. 15), that is the direction in which the point $X_1$ makes equal the opening areas of the ports $31a_1$ and $31a_2$ with respect to the cavities $33a$ and $33l$. On the other hand, when the spool 32 moves even a little in the clockwise direction so that the opening area of the cavity $33a$ with respect to the port $31a_1$ decreases while the opening area of the cavity $33l$ with respect to the port $31a_2$ increases, then the spool 32 together with the rotary type fluid driving mechanism 50 is caused to rotate in the counterclockwise direction, that is the direction in which the point $X_1$ makes equal the opening areas of the ports $31a_1$ and $31a_2$ with respect to the cavities $33a$ and $33l$. On the other hand, when the spool 32 moves even a little in the clockwise or counterclockwise direction from the state in which the point $Y_1$ makes equal the opening areas of the ports $31a_1$ and $31a_2$ with respect to the cavities $33a$ and $33b$, the spool 32 is caused to keep moving on in the clockwise or counterclockwise direction by the actuation which is completely reverse to the above described actuation. These actuations or functions are same at the points $X_2, X_3 \ldots X_6$ and $Y_2, Y_3 \ldots Y_6$. Thus, the first group of the points $X_1, X_2, X_3 \ldots X_6$ are the stabilizing points where the spool 32 is stopped in a stabilized state. The above described explanation holds for the structures shown in FIGS. 17 and 19.

The positions of two pairs of the ports $31b_1$ and $31b_2$, and $31c_1$ and $31c_2$ are spaced a distance of ⅓ or ⅔ of (width of land+width of cavity) in the clockwise or counterclockwise direction respectively from one of the points $X_1, X_2, X_3, \ldots$ so that the relative position of the land with respect to the port may be returned to the initial relative position where the spool 32 was first located at the stabilizing position with respect to the ports $31a_1$ and $31a_2$ when the ports are switched over three times as is the case with the prior art control valve. When the ports are disposed as described above, the spool 32 is made to advance a length of (width of land+width of cavity) in the course of three steps so that in the structure shown in FIG. 15 wherein width of land=width of cavity=width of port
3 steps=2×(width of land)

hence, width of land=width of cavity=width of port=1.5 steps

In case of the structure shown in FIG. 17 wherein the width of land is three-quarters of the width of cavity, 3 steps=⅞×(width of land)
width of land=%₇ step hence, width of cavity=width of port=12/7 step Furthermore, in case of the structure shown in FIG. 19 wherein the width of land is one half of the width of cavity, $$3 \text{ steps} = 3 \times (\text{width of land})$$
$$\text{width of land} = 1 \text{ step}$$

hence, $$\text{width of cavity} = \text{width of port} = 2 \text{ steps}$$

Next we obtain the area diagrams of the structures shown in FIGS. 15, 17 and 19, the diagram illustrating the change in the opening area of a port relative to the number of steps. (In this case we assume that the port be of square shape for simplifying the calculation). We plot as the abscissa the number of steps and as the ordinate $$[\text{opening area} - \text{area of port}/2]/\text{area of port}/2$$

Figure 23:
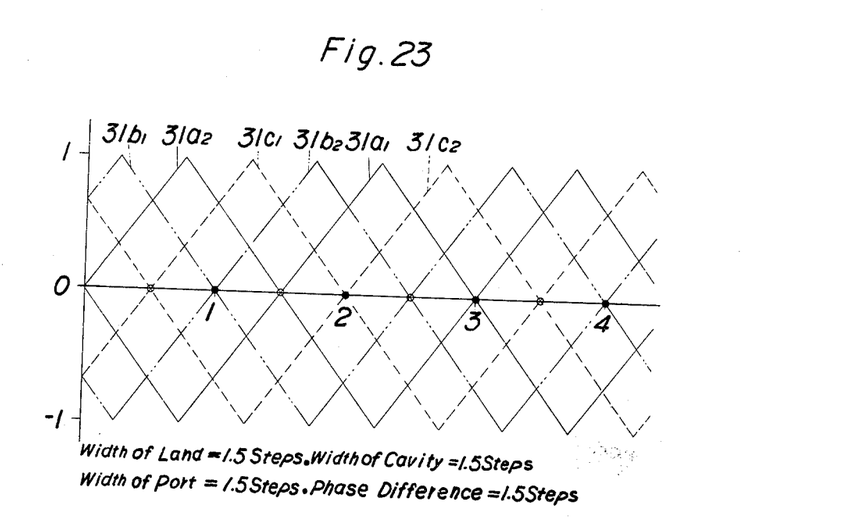
FIGURES 23 to 31 are area diagrams showing the number of steps versus the opened area of each port of the above described various types of control valve of the present invention.
Figure 24:
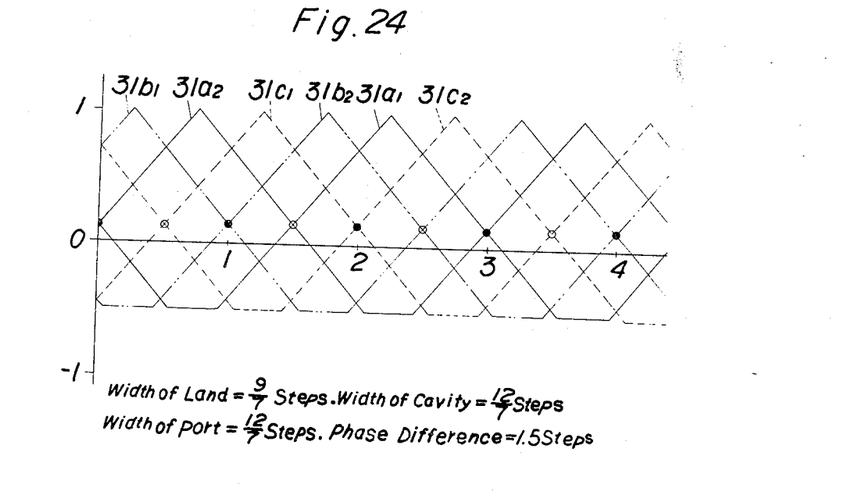
Figure 25:
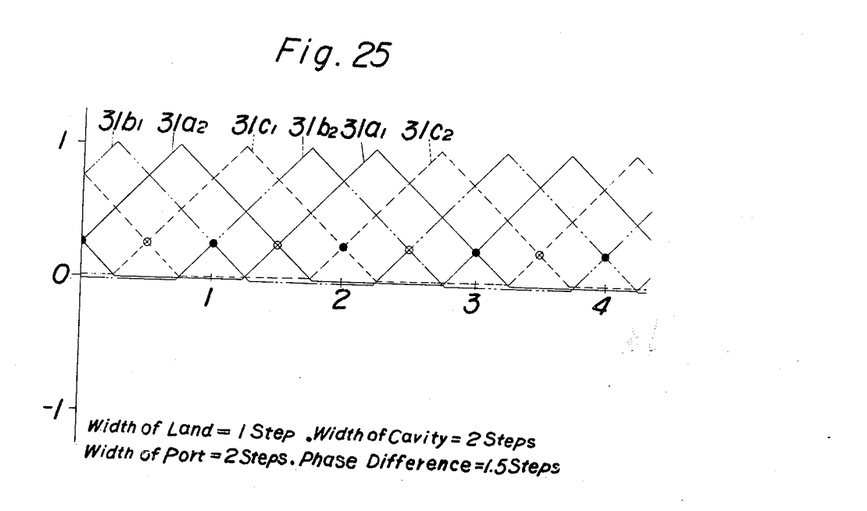

Then, the area diagrams of the structures shown in FIGS. 15, 17 and 19 are graphically represented in FIGS. 23, 24 and 25 respectively. From these area diagrams the maximum and minimum opening areas, the change in the ratio of saturation of area in the course of one step of each port of each structure will be clearly seen.

Figure 26:
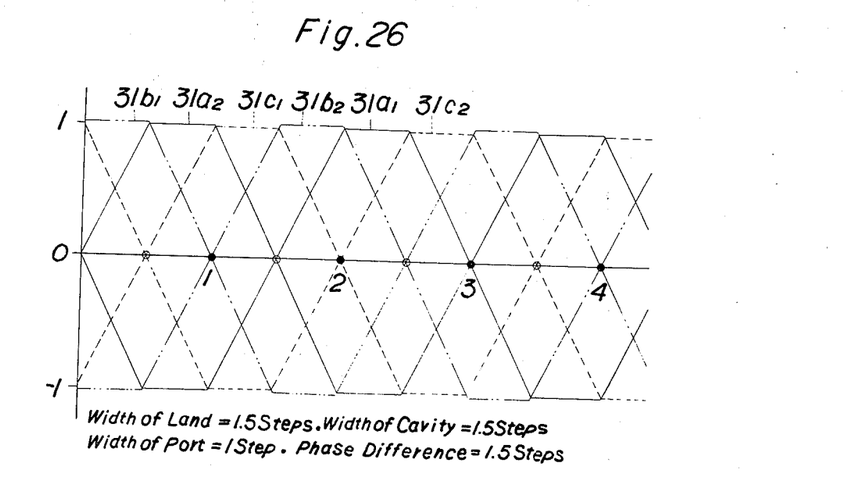
Figure 27:
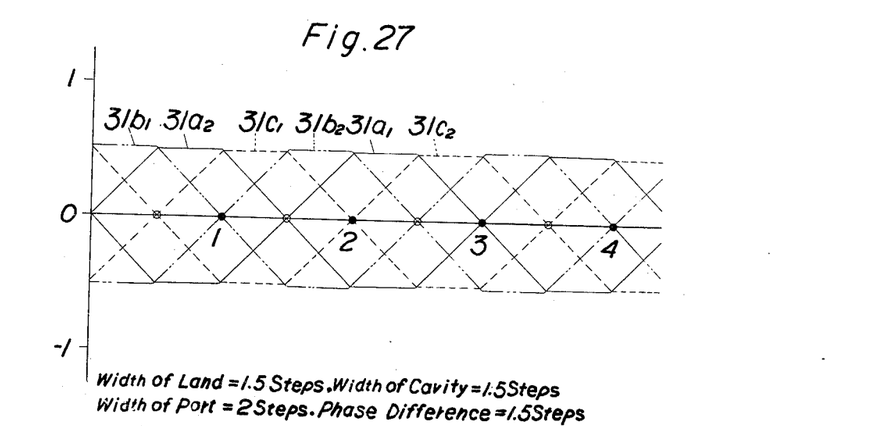
Figure 28:
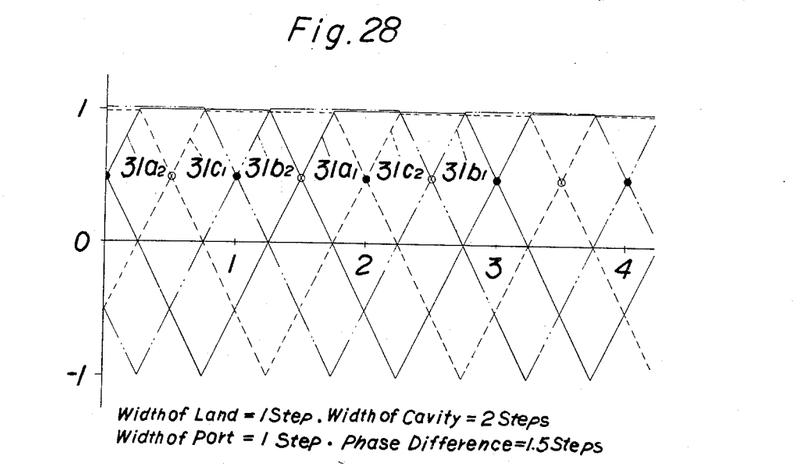
Figure 29:
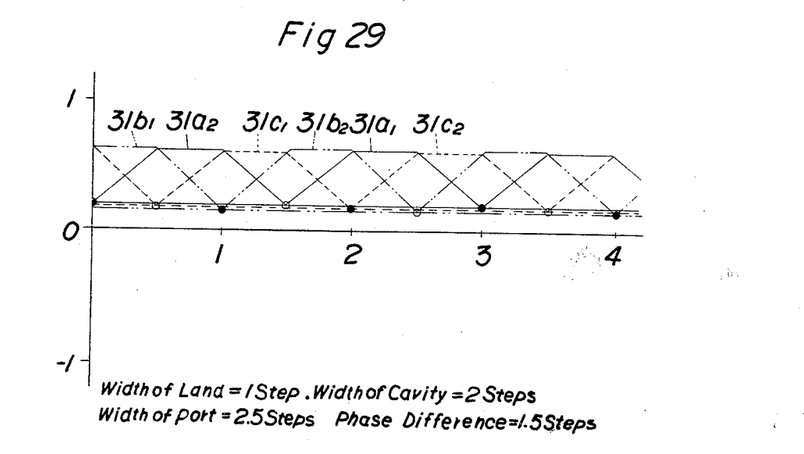

In the diagrams shown in FIGS. 23, 24 and 25, the black circular marks indicate the stabilizing points where the opening areas of the selected pair of ports are made equal. The white circles shown between the black circle marks indicate the instable points. In FIGS. 15, 17 and 19, only one kind of port is shown with respect to the widths of land and cavity, but various kinds of port can be conceivable as is the case of the width of land or cavity. The employment of various kinds of port makes it possible to vary the area diagram as desired. That is, FIGS. 26 and 27 are the area diagrams when only the widths of port are selected at 1 and 2 steps respectively in the structure shown in FIG. 15, while FIGS. 28 and 29 are the area diagrams when only the widths of the port are selected at 1 and 2.5 steps respectively in the structure shown in FIG. 19.

From the area diagrams shown in FIGS. 23 to 29, it will be noted that at each stabilizing point the opening area of the selected port (hereinafter referred as "stabilizing point opening") is always equal to or larger than area of port/2 (hereinafter referred as "½"). In this case the quantity of leaking working liquid becomes too much when the width of port is large and when the control valve 300 rests at the stabilizing point. Therefore, it is preferable to have the structure in which at least the "stabilizing point opening" may be arbitrarily determined or selected. Now referring to FIGS. 15, 17 and 19, it will be noted that the right and left side cavity groups are shifted in phase by 1.5 step with respect to each other. Therefore, it will be readily understood that the "stabilizing point opening" can be made smaller when the left side and right side cavity groups are displaced downwardly and upwardly respectively by the same distance so as to minimize the phase difference between the two cavity groups. With this idea the phase shifts between both of the cavity groups in the control valve 300 shown in FIG. 15 are selected at 1.5, 1.0 and 0.5 step respectively as shown in FIGS. 20 and 21.

Figure 20:
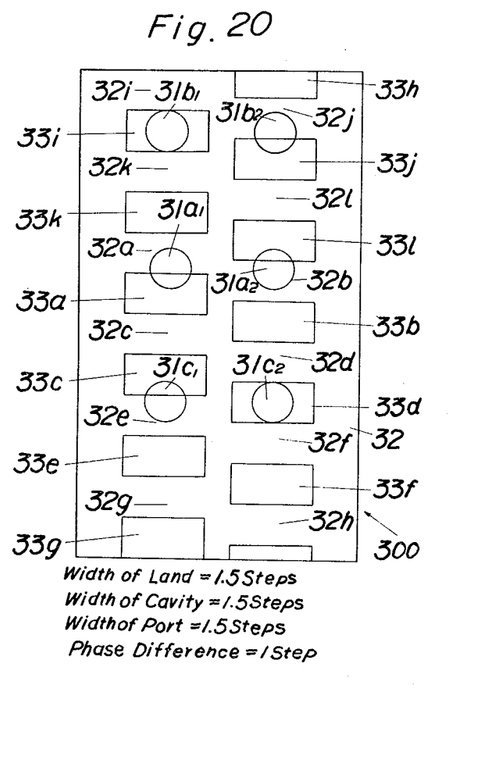
Figure 21:
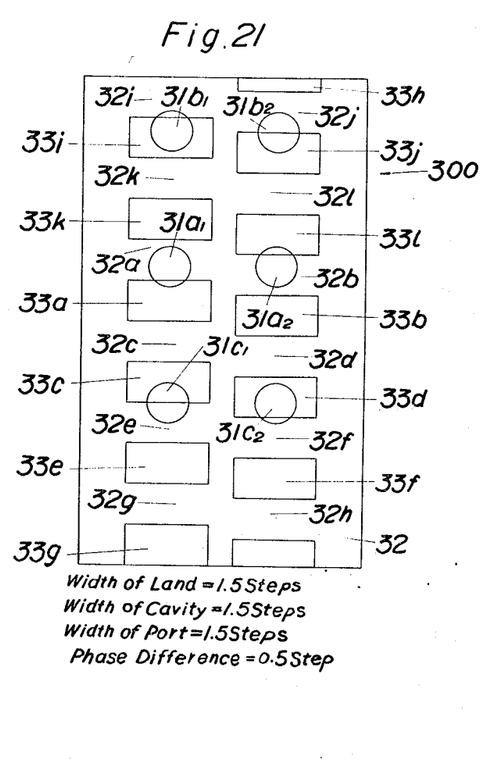
Figure 30:
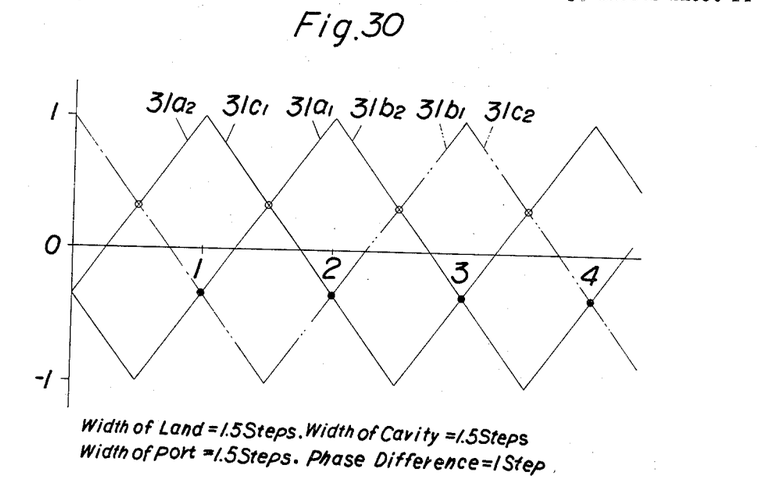
Figure 31:
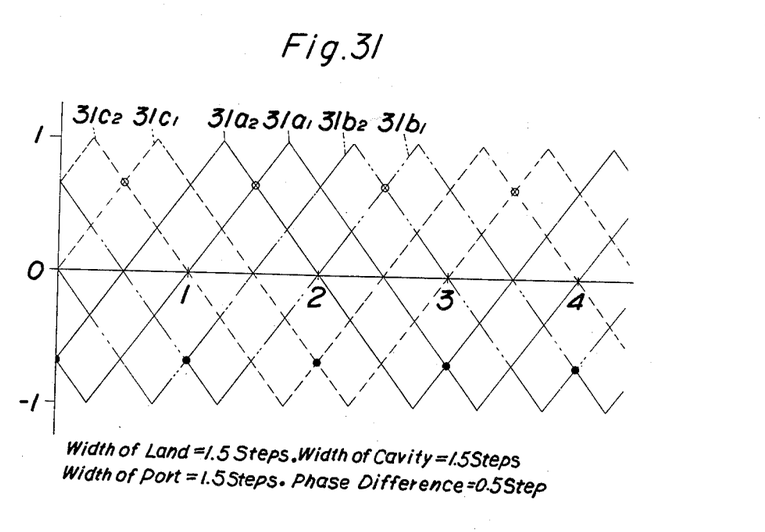

The area diagrams of the structures shown in FIGS. 20 and 21 are graphically represented in FIGS. 30 and 31. From these diagrams it will be seen that the structure of FIG. 20 in which the phase difference is selected to 1 step has a decreased value of ⅔ while the structure of FIG. 21 in which the phase difference is made to 0.5 step has a decreased value of ⅓. It will be noted here that even when the width of port in the structures shown in FIGS. 20 and 21 varies, only the saturated regions of the maximum and minimum opening areas of a port vary as described hereinbefore.

Figure 22:
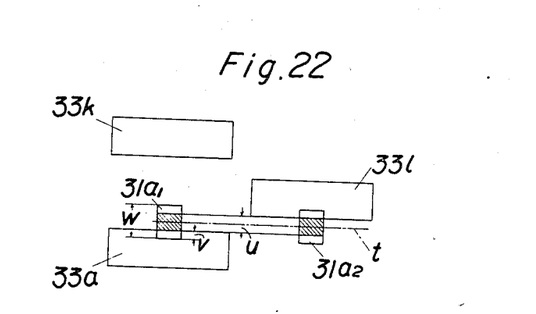
FIGURE 22 is an explanatory view for obtaining the "stabilizing point opening" of control valve.

Furthermore, in the structures shown in FIGS. 15, 17 and 19, the (width of land) $\leq$ (the width of cavity) and the ratio of the width of land to the width of cavity has a close relationship with the degree of the "stabilizing point opening." That is, in order that the ports $31a_1$ and $31a_2$ (we assume that these ports be of square shape for the sake of explanation) disposed in alignment with each other as shown in FIG. 22 may have the same opening areas with respect to the cavities $33a$ and $33l$ and be in the stabilized state, the center line $t$ of both ports $31a_1$ and $31a_2$ must be located intermediate of the upper side edge of the cavity $33a$ and the lower side edge of the cavity $33l$. Now let it be assumed that the phase difference between the cavity groups be 1.5 step, then the distances between the cavities $33a$ and $33l$, and $33l$ and $33k$ are made equal. Therefore, the longitudinal length $u$ of the hatched region of the port $31a_1$ becomes a half of (the width of land—the width of cavity). Since the longitudinal lengths at the upper and lower portions of the hatched region of the port $31a_1$ must be equal, the longitudinal length $v$ of a portion of the port $31a_1$ opening to the cavity $33a$ is $$v = [\text{width of port} - \text{width of land} - \text{width of cavity}) \times \tfrac{1}{2}] \times \tfrac{1}{2}$$

Therefore, the stabilizing point opening can be obtained from the following equation $$\text{stabilizing point opening} = v/w$$

$$= \frac{\text{width of port} - \dfrac{\text{width of land} - \text{width of cavity}}{2}}{2 \times \text{width of port}}$$

where $w$ is the length in the longitudinal direction of the port $31a$. From this equation it will be seen that the "stabilizing point opening" can be selected arbitrarily when the widths of land and cavity are suitably selected. That is, when (the width of land—the width of cavity) = the width of port, then the "stabilizing point opening" is ¼. It is further possible to make the "stabilizing point opening" zero when (the width of land—the width of cavity) = 2 × (the width of port). However, when the widths of land and cavity are made equal as shown in the structure of FIG. 15, the "stabilizing point opening" remains always ½ regardless of the width of port.

In the control valve 300 heretobefore described, the sleeve 31 thereof is provided with three ports $31a_1$, $31b_1$ and $31c_1$ and further three ports $31a_2$, $31b_2$ and $31c_2$. These three ports make one set respectively. Therefore, a plurality of ports of the type which satisfy the same condition as described above may be provided in the sleeve 32 and opened to the outside sequentially under a certain condition.

The essential features of the invention have been described in this specification with reference to preferred embodiments of the invention and it will be appreciated by those skilled in the art that variations, alternations and/or modifications may be resorted to without departing from the spirit and scope of the present invention.

What is claimed is:

1. A control valve, comprising a sleeve member having a circumferential wall; a spool member accommodated in said sleeve member for relative movement and having an outer circumferential surface; a first group and a second group of equi-angularly spaced cavities in said outer surface, said first group being located closer to one and said second group being located closer to the other axial end of said spool member and being circumferentially offset relative to the cavities of said first group; one of said sleeve and spool members being provided with at least two bores, one of said two bores being communicated with one of said two cavity groups while the other of said two bores being communicated with the other of said two cavity groups, and a first and a second set of ports provided in said circumferential wall and each comprising three circumferentially spaced ports, said ports being so arranged in said wall and related to said cavities that, when respective ones of said cavities of said first and second groups each communicate with one port from the respective sets via apertures of identical cross-sectional areas, the remaining two ports of each set are respectively located proximal to stabilizing positions located at opposite sides of and circumferentially displaced from a stabilizing position defined by the cavity with which said one port of the respective set communicates.

2. A valve as claimed in claim 1, wherein said spool member is rotatable within said sleeve member, and said remaining two ports are located spaced apart a distance of ⅓ or ⅔ of (the width of land+the width of cavity) from the stabilizing point next to said two remaining ports.

3. A valve as claimed in claim 2 further comprising grooves provided at both ends of said spool member, and one of said grooves provided at one end communicates one of said cavity groups with one of two bores provided in said spool member while the other of said grooves provided at the other end of said spool communicates the other of said cavity groups with the other of said two bores.

4. A valve as claimed in claim 2 both ends of said sleeve member being provided with sets of openings, each set consisting of three openings being disposed axially and corresponding with each port provided in said sleeve member, and wherein during said movement the openings located at one end of said sleeve member are communicated with one of said two cavity groups provided in said spool member while the openings located at the other end are communicated with the other of said two cavity groups.

5. A control valve as claimed in claim 1, one of said members being rotatable with reference to the other.

6. A control valve as claimed in claim 1, wherein said spool member comprises lands each located intermediate two adjacent ones of said cavities; and wherein said remaining two ports of the respective sets are each spaced from their associated proximal stabilizing location by a distance at least approaching ⅔ of the combined width of a cavity and a land.

7. A control valve as defined in claim 6, wherein said distance is at least substantially equal to ⅓ of said combined width.

References Cited

UNITED STATES PATENTS

| | | | |
|---|---|---|---|
| 1,546,579 | 7/1925 | Hammond | 137—625.23 X |
| 3,213,881 | 10/1965 | Findlay et al. | 137—625.24 X |

M. CARY NELSON, Primary Examiner

M. O. STURM, Assistant Examiner

U.S. Cl. X.R.

137—625.47